United States Patent [19]

Kamimura et al.

[11] Patent Number: 5,029,328
[45] Date of Patent: Jul. 2, 1991

[54] METHOD OF CONTROLLING ACTIVE SUSPENSIONS FOR AN AUTOMOTIVE VEHICLE

[75] Inventors: Katsuyoshi Kamimura; Atsushi Mine; Yutaka Hiwatashi, all of Tokyo, Japan

[73] Assignee: Fuji Jukogyo Kabushiki Kaisha, Tokyo, Japan

[21] Appl. No.: 425,961

[22] Filed: Oct. 24, 1989

[30] Foreign Application Priority Data

Oct. 31, 1988 [JP] Japan .............................. 63-275939

[51] Int. Cl.$^5$ .......................................... B60G 17/00
[52] U.S. Cl. ................................ 364/424.05; 280/707
[58] Field of Search ................... 364/424.05; 280/707, 280/840

[56] References Cited

U.S. PATENT DOCUMENTS

| 4,712,807 | 12/1987 | Kurosawa | 364/424.05 |
| 4,803,627 | 2/1989 | Yasuike et al. | 364/424.05 |
| 4,865,347 | 9/1989 | Fukushima et al. | 280/707 |
| 4,888,696 | 12/1989 | Akatsu et al. | 364/424.05 |
| 4,924,392 | 5/1990 | Kurosawa | 280/707 |

*Primary Examiner*—Gary Chin
*Attorney, Agent, or Firm*—Beveridge, DeGrandi & Weilacher

[57] ABSTRACT

To carry out a method of controlling a plurality of active suspensions for an automotive vehicle, a normal/reverse rolling selection switch and a plurality of correction logics are provided in a control system including a longitudinal acceleration sensor and a lateral acceleration sensor. The correction logics correct a quantity of rolling moment, a variation of suspension reactive force, a control quantity of fluid and variation of a reference vehicle height. A signal from the lateral acceleration sensor and a signal from the normal/reverse rolling selection switch are inputted into a reference vehicle height correcting circuit to control a reference vehicle height corresponding to each active suspension.

2 Claims, 4 Drawing Sheets

METHOD OF CONTROLLING ACTIVE SUSPENSIONS FOR AN AUTOMOTIVE VEHICLE

BACKGROUND OF THE INVENTION

1. Field of the Invention

The present invention relates generally to a method of controlling a plurality of active suspensions for an automotive vehicle. More particularly, the present invention relates to a method of controlling the active suspensions, wherein a plurality of correction logics are provided in a control system including a longitudinal acceleration sensor and a lateral acceleration sensor.

2. Description of the Related Art

A conventional control system of active suspensions for an automotive vehicle using pneumatic springs includes a vertical acceleration sensor, a suspension stroke sensor, a controller and a flow rate control valve. The vertical acceleration sensor detects a vertical acceleration above the spring for each of front/left, front/right, rear/left and rear/right air suspensions. The suspension stroke sensor detects a vertical relative displacement quantity above and below the spring for each air suspension. The controller calculates an instruction air flow quantity to be fed to and discharged from each air suspension based on the vertical acceleration above the spring detected by the vertical acceleration sensor, on the vertical relative displacement quantity detected by the suspension stroke sensor and on a vertical relative displacement speed obtained from the vertical relative displacement quantity by calculation. The flow rate control valve performs air feeding or air discharging in accordance with the instruction flow quantities independently for each air suspension. With the conventional active suspensions, each air suspension is controlled independently so as to vary an apparent mass of the vehicle body and damping and spring effecta. The above-described control system of the active suspensions have been developed by the same applicant of the present patent application and it was already laid open under Japanese Laid-Open Patent NO. 139,709/1987.

The conventional active suspensions are controlled by feeding and/or discharging air in each air suspension according to a vertical acceleration of the mass above the spring, and a relative displacement and a relative displacement speed between the masses above and below the spring. Thus, it is very effective for a soft feeling when receiving a sudden upward impulse from a road. Moreover, it is also very effective to keep the vehicle in proper attitude when receiving a slow moving force from the road.

In addition, with respect to the conventional control system of the active suspensions, it has been proposed that the control system is additionally provided with means for detecting a longitudinal acceleration of the vehicle body, means for detecting a lateral acceleration of the vehicle body and a control logic for controlling an attitude of the vehicle body under a transitional condition during acceleration or turning movement of the vehicle based on the longitudinal acceleration and the lateral acceleration.

With respect to rolling caused by centrifugal force during turning movement of the vehicle, it is preferable that a rolling angle is generated in the opposite direction to a steering direction of a conventional vehicle, and it is more natural that a rolling angle is generated in the steering direction of the conventional vehicle. Accordingly, there is existent a problem that the vehicle body maintains a horizontal attitude during turning movement of the vehicle.

The present invention has been made to solve the foregoing problems.

SUMMARY OF THE INVENTION

An object of the present invention is to provide a method of controlling a plurality of active suspensions wherein the aforementioned problem is solved completely.

The present invention provides a method of controlling a plurality of active suspensions for an automotive vehicle, each of the active suspensions having respective valves to feed fluid in the active suspension and discharge the fluid from the active suspension, wherein the method comprises the steps of detecting a lateral acceleration, indicating a desired rolling angle and a rolling direction in dependency on a selection of a normal/reverse rolling selection switch, calculating a rolling moment in response to the lateral acceleration and the desired rolling angle, computing a lateral displacement quantity for each wheel in response to the rolling moment, deriving a variation of a lateral force for each wheel in response to the lateral acceleration, estimating a vertical variation of a vertical ractive force for each wheel in consideration of deformation of the active suspension caused by the desired rolling angle in response to the lateral displacement quantity, lateral force, type of the active suspension and desired rolling angle, deciding a first control quantity corresponding to the amount of fluid to feed in or discharge from the active suspension in response to the variation of the vertical reactive force, and operating a control valve for each active suspension in response to the control quantity so as to maintain the optimum rolling angle.

Further, according to the present invention, the method further includes the steps of detecting a vertical relative displacement, generating a reference vehicle height in response to a signal of a vehicle height adjusting switch, calculating a difference between the vertical relative displacement and the reference vehicle height, computing an actual rolling angle in response to the lateral acceleration, deriving a desired vertical relative displacement corresponding to the actual rolling angle, correcting the difference from the desired vertical relative displacement, and estimating a second control quantity to reduce the corrected difference equal to zero so as to operate the valve in response to the first and second control quantities.

Consequently, a driver can arbitrarily select roll feeling in dependency on his own choice by actuating the normal/reverse rolling selection switch. Further, he can make smooth rolling in proportion with the lateral acceleration with high accuracy. In addition, he can maintain a desired rolling degree during normal turning movement of the vehicle.

A preferred embodiment of the present invention will become understood from the following detailed description with reference to the accompanying drawings.

BRIEF DESCRIPTION OF THE DRAWINGS

The present invention is illustrated in the following drawings in which.

DESCRIPTION OF THE PREFERRED EMBODIMENT

Now, the present invention will be described in detail hereinafter with reference to the accompanying drawings which illustrate an embodiment thereof.

Figure 1:
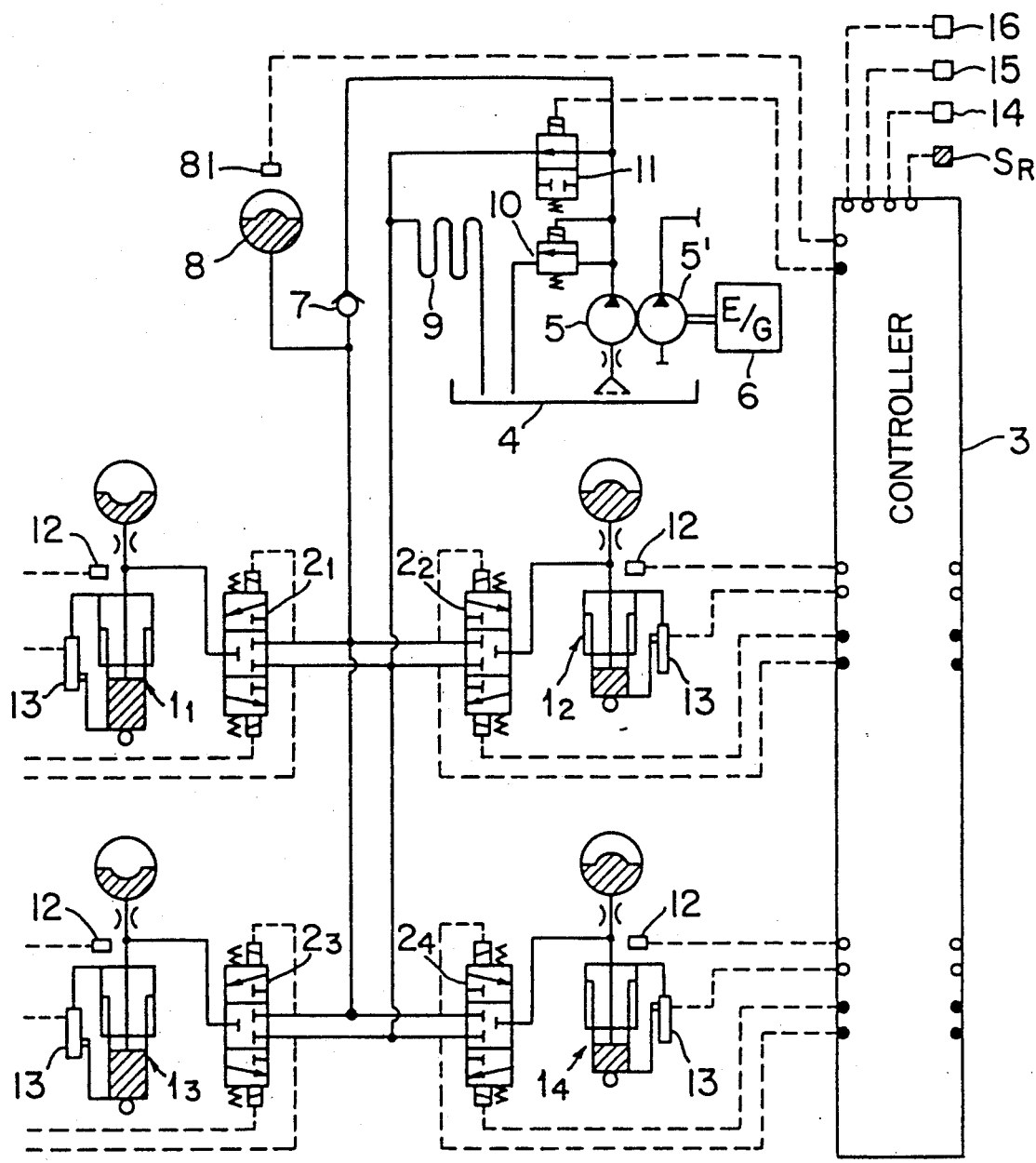
FIG. 1 is an explanatory view schematically illustrating a plurality of hydraulic lines required for carrying out a method of controlling a plurality of active suspensions for an automotive vehicle in accordance with an embodiment of the present invention.

FIG. 1 is a schematic view illustrating a plurality of active suspensions to which the present invention is applied.

Referring to the drawing, reference numerals $1_1$ and $1_2$ designate active suspensions for left/front and right/front wheels and reference numerals $1_3$ and $1_4$ designate active suspensions for left/rear and right/rear wheels. FIG. 1 illustrates by way of example a plurality of conventional hydropneumatic suspensions. In detail, each suspension comprises a hydraulic cylinder and a pneumatic spring member wherein the pneumatic spring member includes a hydraulic chamber and a closed pneumatic chamber both of which are separated from each other via a diaphragm. The hydraulic chamber of the pneumatic spring member is communicated with a hydraulic chamber of the hydraulic cylinder via an orifice, and one end of the hydraulic cylinder (e.g., a bottom of the hydraulic cylinder) is operatively connected to a wheel suspension arm, while the other end of the hydraulic cylinder (e.g., a piston rod) is operatively connected to a vehicle body member for the respective suspensions. In response to a load in the vertical direction, hydraulic oil flows between the hydraulic chamber of the hydraulic cylinder and the hydraulic chamber of the pneumatic spring member, whereby an adequate intensity of damping force is generated and a spring effect is derived by volumetric elasticity of gas which is enclosed in the pneumatic chamber of the pneumatic spring member using a diaphragm.

Reference numerals $2_1$, $2_2$, $2_3$ and $2_4$ designate control valves, respectively. The hydraulic oil in the hydraulic cylinder of each suspension is charged and discharged by the control valves $2_1$ to $2_4$. The respective control valves $2_1$, $2_2$, $2_3$ and $2_4$ are independently controlled in response to a valve operating signal from a controller 3.

Reference numeral 4 designates an oil reservoir and reference numeral 5 designates a hydraulic pump. The hydraulic pump 5 is driven by an engine 6. In the shown embodiment, the hydraulic pump 5 and another hydraulic pump 5 for the purpose of power steering are operatively connected to each other in tandem arrangement so that they are simultaneously driven by the engine 6.

The hydraulic oil discharged with high pressure from the hydraulic pump 5 is accumulated in an accumulator 8 via a check valve 7. When one or more control valves are shifted to feed the hydraulic oil, the high pressure hydraulic oil is fed into the hydraulic chambers of one or more hydraulic cylinders corresponding to the shifted control valves. When one or more control valves are shifted to discharge the hydraulic oil, the hydraulic oil is drained in the oil reservoir 4 from the hydraulic chambers of one or more hydraulic cylinders corresponding to the shifted control valves via an oil cooler 9.

Reference numeral 10 designates a relief valve and reference numeral 11 designates a loading/unloading valve. The loading/unloading valve 11 is shifted to the unloaded state shown in FIG. 1 in response to a signal from the controller 3, when a pressure sensor 81 detects that the accumulator 8 is filled with hydraulic oil having a preset pressure. An extra quantity of the hydraulic oil discharged from the hydraulic pump 5 is returned to the oil reservoir 4 via the oil cooler 9.

Each of the suspensions $1_1$, $1_2$, $1_3$ and $1_4$ is equipped with a vertical acceleration sensor 12 for detecting a vertical acceleration of the mass above the spring and a suspension stroke sensor 13 for detecting a displacement above the spring relative to a displacement below the spring so that information on the vertical acceleration above the spring as well as the vertical relative displacement are inputted into the controller 3 for each suspension.

Reference numeral 14 designates a longitudinal g sensor for detecting a longitudinal acceleration of a vehicle body, i.e., a longitudinal g of the vehicle body and reference numeral 15 designates a lateral g sensor for detecting a lateral acceleration of the vehicle body, i.e., a lateral g of the vehicle body. The controller 3 receives informations on the longitudinal acceleration detected by the longitudinal g sensor 14 as well as the lateral acceleration detected by the lateral g sensor 15.

Further, reference character $S_R$ designates a normal/reverse rolling selection switch. This switch $S_R$ is used to selectively determine a direction of rolling of the vehicle body during turning movement of the vehicle and a degree of rolling of the vehicle body.

Next, a control logic for the controller 3 will be described below with reference to FIG. 2.

Figure 2:
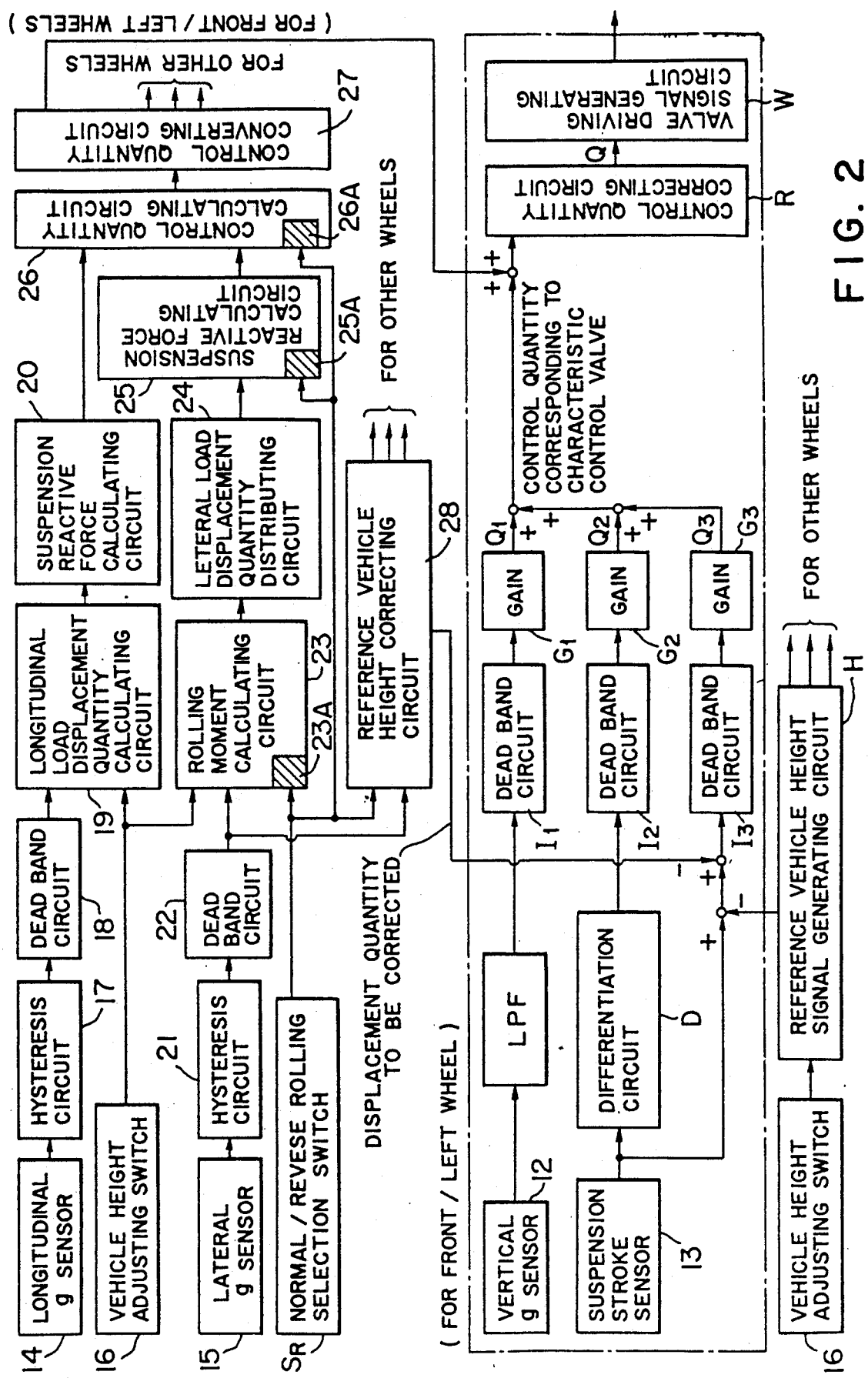
FIG. 2 is a block diagram illustrating a plurality of correction logics employed for the method shown in FIG. 1.

A section A surrounded by a dashed line in FIG. 2 represents a control block diagram for one of left/front, right/front, left/rear and right/rear suspensions. For example, FIG. 2 shows the suspension $1_1$ for the left/front wheel. Although the suspension system is provided with four control logics having the same structure as that of the control logic, one of them is shown in FIG. 2 for the purpose of simplification of illustration, the suspensions are controlled independently for each other.

The sensors 12 and 13 detect the vertical acceleration and the vertical relative displacement and output a vertical acceleration signal and a vertical relative displacement signal, respectively. The control logic permits the longitudinal acceleration signal to pass through a low-pass filter LPF thereby to reduce a high frequency component of the signal. Then, the signal passes further through a dead band circuit $I_1$ to remove or separate a signal having a preset range in the vicinity of zero, whereby an instruction control quantity $Q_1$ matching with characteristics of the relevant control valve is obtained by multiplying the resultant signal by a gain $G_1$.

On the other hand, the vertical relative displacement signal is divided into two parts, one part being to pass through a differentiation circuit D and the other one being to pass without any change. The signal which has passed through the differentiation circuit D becomes a vertical relative displacement speed signal. The resultant signal passes further through a dead band circuit $I_2$ to remove or separate a signal having a preset range in the vicinity of zero, whereby an instruction control quantity $Q_2$ matching with characteristics of the relevant control valve is obtained by multiplying the resultant signal by a gain $G_2$. On the other hand, the signal which has passed without change becomes an actual relative displacement signal by subtracting a difference from a reference vehicle height signal. The reference signal is derived from a vehicle height adjusting switch 16 via a reference vehicle height signal generating circuit H. Then, the resultant signal passes through a dead band circuit $I_3$ to remove or separate a signal having a preset range in the vicinity of zero, whereby an instruction control quantity $Q_3$ matching with characteristics of the relevant control valve is obtained by multiplying the resultant signal by a gain $Q_3$.

The aforementioned three instruction control quantities $Q_1$, $Q_2$ and $Q_3$ each matching with characteristics of the relevant control valve represent an instruction valve opening time to feed the hydraulic oil in or to discharge the hydraulic oil from the control valve, while taking into account valve opening/closing characteristics.

The instruction control quantities $Q_1$, $Q_2$ and $Q_3$ are added to each other and then pass through a quantity circuit R for correcting an instruction control quantity so that the resultant quantity is converted into a corrected instruction quantity Q in response to various conditions such as temperature, pressure loss due to pipe length and others taken into account. Then, the corrected instruction quantity Q passes through a valve driving signal generating circuit W so that a control valve opening/closing signal is generated. Consequently, the control valve $2_1$ is shifted to feed the hydraulic oil to or discharge the hydraulic oil from the suspension $1_1$ in accordance with the corrected instruction quantity Q.

During a period of the aforementioned control, the hydraulic oil in the suspension $1_1$ is discharged therefrom in response to the upward acceleration, whereas the hydraulic oil is fed in the suspension $1_1$ in response to the downward acceleration. Consequently, when the suspension receives force from the below such as pushing-up force from the road surface, soft and high-damping suspension characteristics are exhibited. And when the suspension receives force from the above (i.e., force exerted from the vehicle body), apparently hard suspension characteristic is exhibited to maintain the current vehicle height at a specific reference vehicle height in cooperation with the control based on the vertical relative displacement as well as the relative displacement.

Further, since the vertical acceleration signal passes through the low pass filter LPF, the suspension hardly reacts in response to vibration in a high frequency region such as resonance below the spring, but the control is carried out mainly for vibration having a low frequency region in the vicinity of resonance above the spring. As a result, the vehicle has low fuel consumption, good drivability and excellent bouncing property.

Incidentally, the vehicle height adjusting switch 16 is used for changing the height from a normal vehicle height to a high vehicle height. In the case where the normal vehicle height is selected, the reference vehicle height signal generating circuit H generates a low reference vehicle height signal, and thereafter when the vehicle height adjusting switch 16 is shifted to a high vehicle height position, the reference vehicle height signal generating circuit H generates a high reference vehicle height signal. Since the control is carried out to maintain the current vehicle height at the specific reference vehicle height in response to the vertical relative displacement signal, the instruction control quantity $Q_3$ is generated when the specific reference vehicle height is shifted from the low normal reference vehicle height to the high reference vehicle height. Then, the suspension $1_1$ is fed with the hydraulic oil, whereby the vehicle height is raised up to a height equal to the high reference vehicle height. However, when the vehicle height adjusting switch 16 is returned to the normal vehicle height side, the instruction control quantity $Q_3$ is generated to discharge the hydraulic oil in the suspension $1_1$, whereby the vehicle height is lowered to the normal vehicle height. It should be noted that feeding and discharging of the hydraulic oil in response to shifting of the vehicle height adjusting switch 16 are simultaneously accomplished with respect to all the suspensions.

A longitudinal g signal detected by the longitudinal g sensor 14 passes through a hysteresis circuit 17 and a dead band circuit 18 so that the longitudinal g signal is converted into a signal which does not react in response to ordinary variation of the longitudinal g during running of the vehicle but acts only when a large magnitude of pitching occurs with the vehicle body at the time of full acceleration or intermediate braking. Thereafter, the signal is inputted into a longitudinal load displacement quantity calculating circuit 19. The longitudinal load displacement quantity calculating circuit 19 calculates a longitudinal load displacement quantity based on the inputted signal with reference to previously stored items relative to the vehicle body and to a height of a gravity center of the vehicle body above the road derived from the vehicle height adjusting switch 16. Then, the longitudinal load displacement quantity calculating circuit 19 outputs results derived from the above-described calculation to a suspension reactive force calculating circuit 20. The suspension reactive force calculating circuit 20 calculates for each suspension a variation of suspension reactive force. In detail, the variation of the suspension reactive force, which is caused by the longitudinal load displacement quantity at the respective suspensions taking account of driving force and braking force active on tires, is calculated based on information on the quantity of displacement of the load in the longitudinal direction, a type of each suspension and a type of driving (i.e., a front wheel driving type, a rear wheel driving type or a four wheel driving type).

In general, moment is caused round the gravity center of the vehicle body by inertia force of the vehicle body during braking or acceleration, whereby the load is displaced in the longitudinal direction. In addition to the above-described moment, moment is caused round a pivotal shaft of a suspension arm by braking force active on the corresponding wheel during braking. Consequently, vertical force active at each suspension becomes equal to a value derived from addition of the moment caused round the pivotal shaft of the suspension arm due to the aforementioned vehicle body inertia force and the moment caused by the braking force. However, since the moment caused by the braking force is different from suspension to suspension particularly in dependency on a type of the suspension, the control can be carried out with higher accuracy by calculating the variation of the suspension reactive force taking into account the suspension type as described above. Further, during acceleration, only the moment caused by the vehicle body inertia force is active on a suspension for a driven wheel but, in case of a suspension for a drive wheel, in addition to the moment caused round the vivotal shaft of the suspension arm due to the vehicle body inertia force, moment is caused round a center of pivotal movement of the suspension arm by the driving reactive force. Thus, control can be carried out with higher accuracy by calculating the variation of the suspension reactive force in consideration of the type of driving as described above.

Also a lateral g signal detected by the lateral g sensor 15 passes through a hysteresis circuit 21 and a dead band circuit 22 such that it does not react in response to slight variation of a lateral g during running of the vehicle. Accordingly, only the signal having a value above a predetermined value is inputted into a rolling moment calculating circuit 23. The rolling moment calculating circuit 23 calculates a generated rolling moment based on the lateral g signal with reference to the previously stored items relative to the vehicle and the vehicle height derived from the vehicle height adjusting switch 16. Further, the rolling moment calculating circuit 23 corrects the generated rolling moment which has been calculated based on the lateral g signal, the vehicle items and the vehicle height, using a correction logic 23A included in the rolling moment calculating circuit 23. The correction logic 23A is intended to calculate an aimed rolling angle based on the signal from the normal/reverse rolling selection switch $S_R$ and a magnitude of the lateral g and then derive moment (normally, about 10% of the rolling moment) caused by lateral displacement of the gravity center due to inclination of the vehicle body by the aimed rolling angle.

Figure 3A:
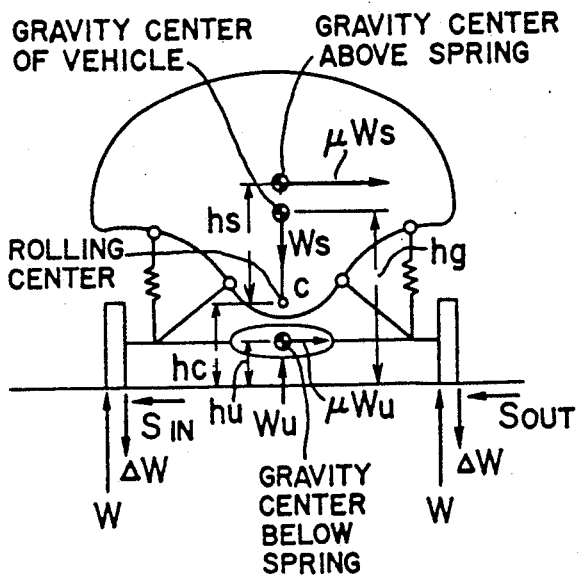
FIG. 3(a) is an explanatory view schematically illustrating a relationship of a force exerted in a suspension system when no rolling moment occurs during turning moment of the vehicle.
Figure 3B:
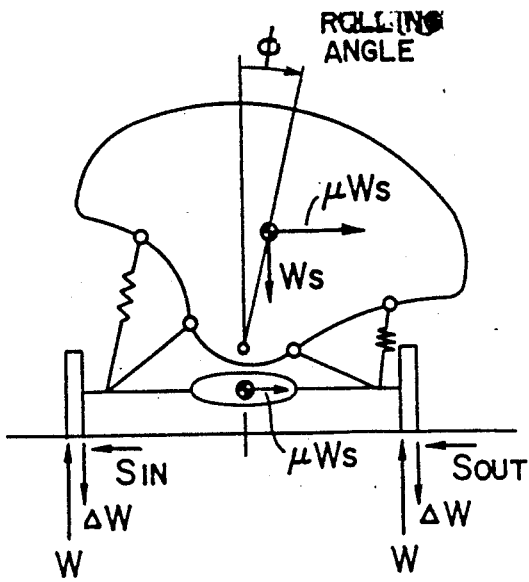
FIG. 3(b) is an explanatory view schematically illustrating a force diagram in the suspension system when a rolling moment occurs during turning movement of the vehicle.

Specifically, the rolling moment $M_{100}$ is expressed by the following equation, when a rolling angle $\phi$ is steadily generated, as shown in FIG. 3(b) (provided that $\phi$ is very small and therefore sin $\phi$ is almost equal to $\phi$ and moreover $\dot\phi$ and $\ddot\phi$ are equal to zero). Here, it is assumed that weight above the spring is represented by $W_s$, weight below the spring is represented by $W_u$, height from a center C of the rolling to the gravity center above the spring is represented by $h_s$, height of the center C of the rolling above the ground is represented by $h_c$, height of a gravity center below the spring above the road is represented by $h_u$, height of the vehicle gravity center G above the road is represented by $h_g$, rolling angle is represented by $\phi$ and centripetal acceleration coefficient during turning movement of the vehicle (coefficient derived by dividing the lateral g with acceleration of gravity force) is represented by $\mu$ (see FIG. 3).

$$M_\phi = \mu W_s h_s + W_s h_s \phi + \mu W_s h_c + \mu W_u h_u \quad (1)$$
$$= \mu W_s (h_s + h_c) + \mu W_u h_u + W_s h_s \phi$$
$$= \mu (W_s + W_u) h_g + W_s h_s \phi$$

Next, when the rolling angle $\phi$ is equal to zero, i.e., no rolling occurs, as shown in FIG. 3(a), the rolling moment $M_{\phi=0}$ is expressed by the following equation.

$$M_{\phi=0} = \mu(W_s + W_u) h_g \quad (2)$$

As will be apparent from these equations, the rolling moment in case where the active suspension is controlled to maintain an attitude of the vehicle body in the horizontal direction when the lateral g is generated is different from the rolling moment in case where rolling is maintained to some extent by the normal/reverse rolling selection switch $S_R$. Accordingly, a correction quantity $\Delta M$ required in the case where the rolling is maintained to some extent can be expressed by the following equation.

$$\Delta M = M\phi - M\phi = 0 = W_s h_s \phi \quad (3)$$

Since it can be presumed from results derived from a number of experiments that a relationship of the rolling angle $\phi$ to the lateral g (y) can be approximated in a proportional relationship under a condition that their critical limit is not taken into account, the above relationship can be expressed as follows.

$$\phi \approx K \cdot Y \quad (4)$$

Further, when it is assumed that K designates a rolling coefficient in the above-described case and Kn designates a rolling coefficient of a conventional vehicle for which no vehicle body attitude control is carried out, the correction quantity $\Delta M$ will be expressed by the following equation.

$$\Delta M = W_s h_s Kn \cdot \frac{K}{Kn} y = W_s h_s Kn \gamma \phi y \quad (5)$$

where it is assumed that $\gamma\phi$ is equal to K/Kn, provided that $\gamma\phi$ designates a rolling degree coefficient.

Here, there is established among conditions of $\gamma\phi=1$, $\gamma\phi=0$ and $\gamma\phi=-1$ such a relationship that the condition of $\gamma\phi=1$ represents a case where a vehicle attitude is controlled so as to generate the same rolling angle as that of the horizontal direction for conventional vehicles including no vehicle body attitude control, the condition of $\gamma\phi=0$ represents a case where the vehicle attitude is controlled in the horizontal direction so that no rolling occurs and the condition of $\gamma\phi=-1$ represents a case where control is carried out so as to generate a rolling angle to the same extent as that of the conventional vehicles in the opposite direction to that of occurrence of rolling with the conventional vehicles.

As will be apparent from the above description, the correction logic 23A corrects the generated rolling moment based on the above equation (5) in response to a signal of $\gamma\phi$ determined by the normal/reverse rolling selection switch $S_r$ and a lateral g signal y of the lateral g sensor 15, under a condition that $\gamma\phi$ is selectively determined at an arbitrary value within a range of $-1 \leq \gamma\phi < 1$ by the normal/reverse selection switch $S_R$.

The exact rolling moment calculated by the rolling moment calculating circuit 23 in the above-described manner is then distributed into a moment for each front wheel and a moment for each rear wheel by a lateral load displacement quantity distributing circuit 24 in accordance with a longitudinal distributing ratio, whereby a lateral load displacement quantity for each front wheel and a lateral load displacement quantity for each rear wheel are calculated separately.

At a suspension reactive force calculating circuit 25, a total lateral force active on tires in correspondence to the generated lateral is longitudinally distributed basically in dependency on to the vehicle gravity center position and the distance between the front wheels and the rear wheels so as to provide a well-balanced state of yaw moment. Then, a variation of a suspension vertical reactive force is calculated separately for the front wheels and the rear wheels with reference to the lateral load displacement quantity, the vehicle height and the type of suspension. However, since a correction logic 25A is included in the suspension reactive force calculating circuit 25 for correcting the variation of the suspension vertical reactive force while taking into account deformation of suspension links caused by the aimed rolling angle in response to the signal of the normal/reverse rolling selection switch SR and the signal y of the lateral g sensor 15, a corrected variation of the vertical reactive force is calculated separately for the front wheels and the rear wheels in dependency on the above-described correction.

Figure 4A:
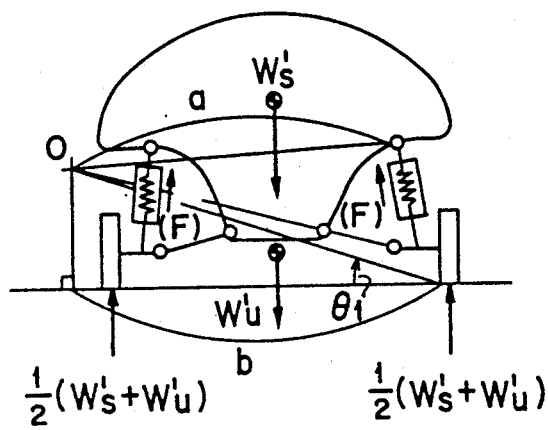
FIG. 4(a) is an explanatory view schematically illustrating a relationship of a force exerted in a suspension link system when no rolling moment is generated.

In detail, as generally shown in FIG. 4(a), when a vertical force only is active on the tires, the suspension reactive force F can be derived in accordance with the following equation in consideration of a suspension lever ratio n which is represented by n=b/a on the assumption that designates a distance between a center O of instantaneous rotation and a suspension spring position and b designates a distance between the tire position and the lower end of a perpendicular line drawn from the instantaneous rotation center O to the ground.

$$F = n(\tfrac{1}{2}W_s') \qquad (6)$$

where Ws designates weight above the spring for the front wheels or the rear wheels and ½ Ws designate weight above the spring for a single wheel.

The lateral load displacement is caused during turning movement of the vehicle (provided that a longitudinal load displacement quantity is neglected because it is small compared with the lateral load displacement quantity) so that a leteral load displacement quantity of $\Delta W$ is applied to outer wheels and a lateral load displacement quantity of $-\Delta W$ is applied to inner wheels. At this moment, lateral forces $S_{out}$ and $S_{in}$ act at positions where the tires come in contact with the road surface. Thus, the variation of the suspension reactive force is determined in dependency on how a summed force of the lateral load displacement quantity $\Delta W$ and the lateral force S is active on a suspension link system.

Figure 4B:
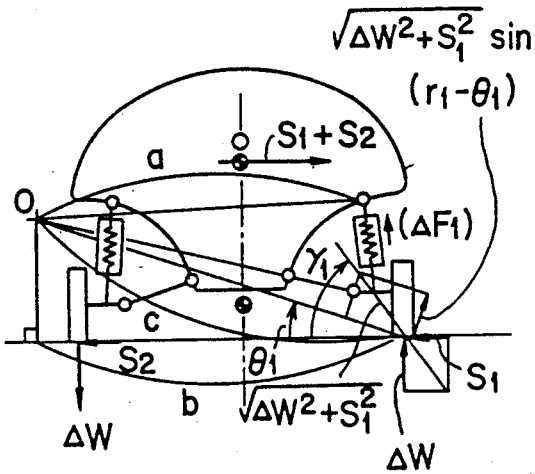
FIG. 4(b) is an explanatory view schematically illustrating a relationship of a force exerted in the suspension link system when the rolling moment is slightly generated.

With respect to the outer wheels which are controlled to provide the rolling angle as represented by $\gamma\phi = 0$, as shown in FIG. 4(b), in spite of the fact that the rolling moment is caused during turning movement of the vehicle, an increment of suspension reactive force $\Delta F_1$ can be derived from the following equation.

$$\Delta F_1 = \frac{c}{a} \sqrt{\Delta W^2 + S_1^2} \, \sin(\gamma_1 - \theta_1) \qquad (7)$$

where length of a line extending from the tire road contact position to the center 0 of the instantaneous rotation is represented by C, an angle of the vehicle body relative to the road surface is represented by $\theta_1$ and an angle of the summed force of the load displacement quantity $\Delta W$ and the lateral force $S_1$ relative to the road surface is represented by $\gamma_1$.

Generally, $\gamma_1 - \phi_1$ is more than zero, compressive force is exerted on the suspensions of each outer wheel and a tensile force is exerted on the suspensions of each inner wheel.

When conditions of $S_1 = 0$ and $\gamma_1 = \pi/2$ are put in the equation (7), the increment of the suspension reactive force $\Delta F_1$ can be expressed in a modified form as follows.

$$\Delta F_1 = \frac{c}{a} \Delta W \sin\left(\frac{\pi}{2} - \theta_1\right) = \frac{c}{a} \Delta W \cos\theta_1 \qquad (7')$$

Further, since b is equal $C \cos \theta_1$, the equation (7') is modified to the following equation (7'').

$$\Delta F_1 = \frac{b}{a} \Delta W = n\Delta W \qquad (7'')$$

The above modified equation (7'') reveals that the vertical force appearing at the wheel center position as expressed by the equation (6) is equal to the suspension reactive force.

Consequently, when the aforementioned suspension reactive force calculation circuit 25 calculates the variation of the suspension reactive force separately for the front wheels and the rear wheels as described above, an exact calculated value can be derived by taking into account the lateral load displacement quantity, the lateral forces active on the tires, the current vehicle height and the type of suspension links.

Figure 4C:
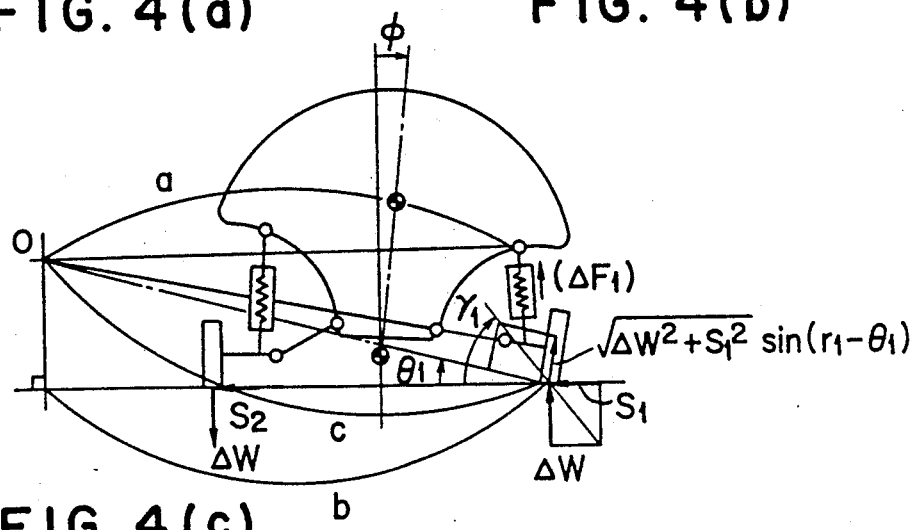
FIG. 4(c) is an explanatory view schematically illustrating a relationship of forces exerted in the suspension link system when the rolling moment is largely generated.

In case where control is carried out to generate a rolling angle o as shown in FIG. 4(c), the values a, b and c in the equation (7) differ from those in the case of $\phi = 0$. Thus, the increment of the suspension reactive force $\Delta F_1$ varies. For example, compensation of these varied values a, b and c may be carried out in such a manner that the values a, b and c to be corrected for the suspension reactive force are predetermined in the form of a map by calculations or experiments and then the correction logic 25A determines a correction value with the reference to the map in accordance with the rolling angle.

Next, a control quantity calculating circuit 26 is such that an additive calculation is performed for each suspension with respect to the variation of the suspension reactive force caused during acceleration, deceleration and turning movement of the vehicle, a total variation of the suspension reactive force is derived for each suspension and a quantity of hydraulic oil to fed in and discharged from each suspension is then calculated to maintain inner pressure corresponding to the total variation of the suspension reactive force for each suspension. Since a correction logic 26A is included in the control quantity calculating circuit 26, a control quantity can be corrected by the correction logic 26A to cause variation of the vertical relative displacement of the suspension in correspondence to the rolling angle $\phi$ determined by the lateral g signal and the signal of the normal/reverse rolling selection switch $S_R$.

Figure 5:
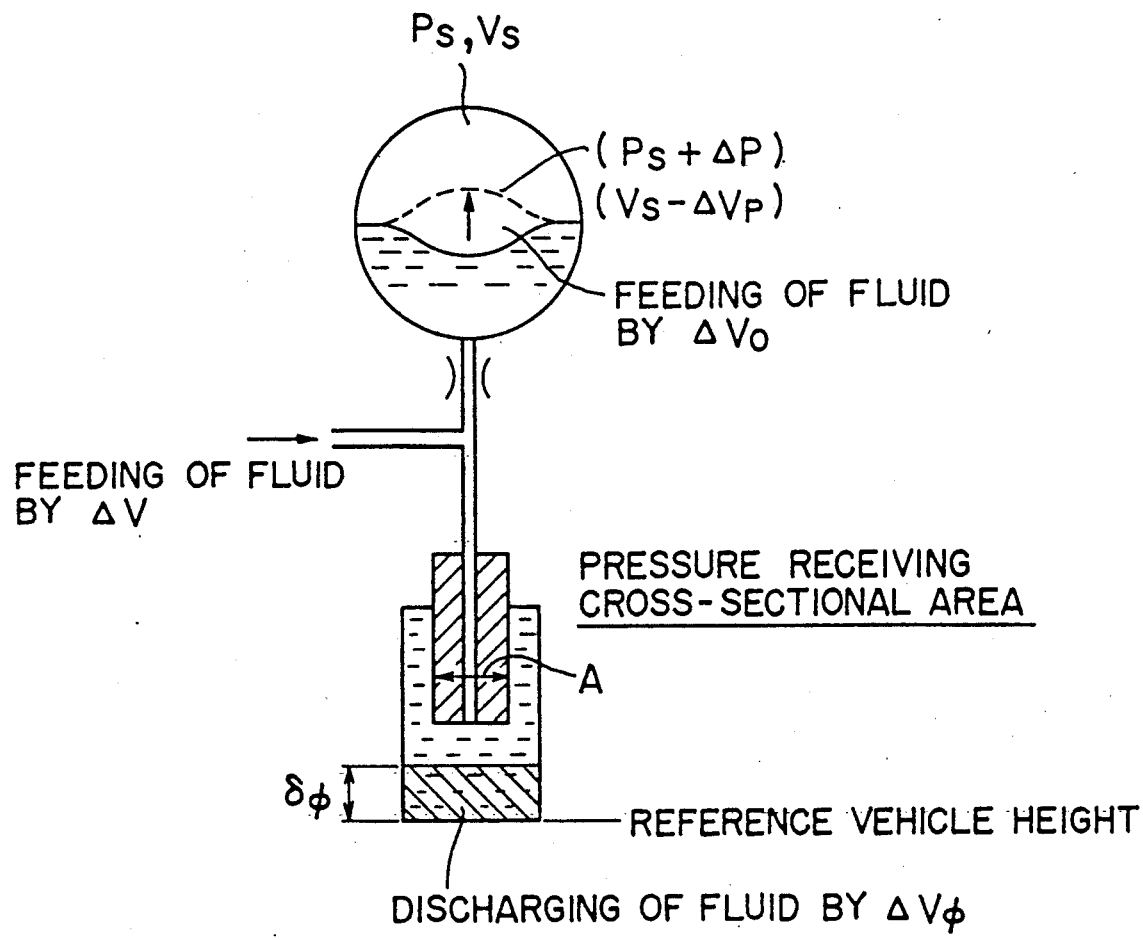
FIG. 5 is an enlarged sectional view of one active suspension shown in FIG. 1, particularly illustrating a relationship between feeding of hydraulic fluid to the suspension and spring reactive force exerted in the suspension.

FIG. 5 is an enlarged sectional view illustrating a single suspension including a pneumatic spring member and a hydraulic cylinder as shown in FIG. 2. When it is assumed that reference inner pressure in a pneumatic chamber is represented by $P_s$, reference volume is represented by $V_s$ and piston pressure receiving area of the hydraulic cylinder (cross-sectional area of a piston) is represented by A, the increment of inner pressure $\Delta P$ in the pneumatic chamber can be derived by an equation of $\Delta P = \Delta F/A$, after the increment of the suspension reactive force $\Delta P$ is calculated.

When inner pressure in the pneumatic chamber is increased from a reference inner pressure $P_s$ by $\Delta P$, a volume reduction quantity $\Delta V_p$ from a reference volume $V_s$ can be determined by the following equations, provided that an adiabatic process of change is executed in the pneumatic chamber due to fine vibration of the suspension.

$$P_s V_s = (P_s + \Delta p)(V_s - \Delta V_p)^m = \text{const.}$$

(where m is equal to 1.4.) Thus, $$(V_s - \Delta V_p)^m = V_s^m \frac{P_s}{P_s + \Delta P}$$

$$V_s - \Delta V_p = V_s \sqrt[m]{\frac{P_s}{P_s + \Delta P}}$$

Consequently, $$\Delta V_p = V_s \left( 1 - \sqrt[m]{\frac{P_s}{P_s + \Delta P}} \right) \quad (8)$$

When the control valve is opened to feed the hydraulic chamber with the pneumatic chamber is reduced by $\Delta V_p$, volume of the pneumatic chamber is reduced by $\Delta V$
and thereby the inner pressure is increased to $P_s + \Delta P$, whereby the increment of the suspension reactive force $\Delta F$ is created with the result that the attitude of the vehicle body can be maintained in the horizontal direction in response to the lateral g.

In case where a predetermined rolling angle $\phi$ is generated by the normal/reverse selection switch $S_r$, the rolling anglr $\phi$ is expressed by the following equation with reference to the equation (5).

$$\phi = \gamma \phi \cdot Kn \, Y \quad (9)$$

The relative displacement $\delta \phi$ of the suspension is expressed by the following equation on the assumption that a tread (representing a distance between the left-hand wheel and the right-hand wheel) is represented by t.

$$\delta \phi = \tfrac{1}{2} t \phi \quad (10)$$

Thus, the relative displacement $\delta \phi$ of the suspension can be expressed in the following modified manner with reference to the equations (9) and (10).

$$\delta \phi = \tfrac{1}{2} t \gamma \phi K n y \quad (11)$$

A correction quantity $\Delta Vo$ of the control quantity required for deriving the relative displacement $\delta \phi$ will be expressed in the following.

$$\Delta V \phi = \gamma \phi \cdot A = \tfrac{1}{2} t A K n \gamma \phi \cdot y \quad (12)$$

Accordingly, the control quantity $\Delta V$ is derived in accordance with correcting the volume reduction quantity Vp derived by the equation (8) with the correction quantity $\Delta V \phi$ volume derived by the equation (12) using the correction logic 26A. The control quantity $\Delta V$ can be expressed by the following equation.

$$\Delta V = \Delta Vp - \Delta V \phi \quad (13)$$

Consequently, the aimed suspension reactive force can be generated at a specified rolling angle $\phi$ by feeding the suspension with the hydraulic oil corresponding to the control quantity $\Delta V$ to provide a well-balanced operative state.

It should be noted that the equation (13) has represented by way of example a control quantity of the outer wheel during turning movement of the vehicle in case where the rolling degree coefficient $\gamma \phi$ is more than zero, i.e., in case where the rolling angle $\phi$ is determined in the same direction as that of conventional vehicles for which no vehicle body attitude control is carried out. However, since the rolling degree coefficient $\gamma \phi$ is less than zero with the outer wheel during turning movement of the vehicle in case where the rolling angle $\phi$ is determined in the opposite direction to that in the case of conventional vehicles, the correction quantity $\Delta V \phi$ derived by the equation (12) becomes a negative value and thereby the control quantity $\Delta V$ becomes $\Delta Vp + \Delta Vo$ after completion of correction.

The control quantity for each suspension calculated by the control quantity calculating circuit 26 in the above-described manner is converted in a control quantity converting circuit 27 into an instruction control quantity matching with characteristics of each control valve, e.g., an instruction valve opening time on a feed side or a discharge side of the control valve. Then, the instruction control quantity is added to the aforementioned instruction control quantities $Q_1$, $Q_2$ and $Q_3$ and the resultant instruction control quantity is inputted into a valve driving signal generating circuit w through a control quantity correcting circuit R so that feeding and discharging of the hydraulic oil are carried out for each suspension.

A lateral g signal from the lateral g sensor 15 and a signal from the normal/reverse rolling selection switch $S_R$ are inputted also into a reference vehicle height correcting circuit 28 in which the rolling angle o is derived from the rolling degree coefficient $\gamma \phi$ and the generated lateral g by the equation (9). Further, in the reference vehicle height correcting circuit 28, a desired relative displacement quantity $\delta \phi$ of the suspension at the time when the rolling angle $\phi$ is generated is calculated for each suspension by the equation (11). Then, the calculated desired displacement quantity $\delta \phi$ is added to the actual relative displacement signal representing the difference between the relative displacement detected by the suspension stroke sensor 13 and the reference vehicle height determined by the vehicle height adjusting switch 16, whereby the reference vehicle height for each suspension is corrected to increase or decrease by a quantity corresponding to the desired displacement quantity $\delta\phi$. As a result, the control system including the suspension stroke sensor 13 carries out control for maintaining the rolling degree determined in the above-described manner. When the lateral g becomes zero on completion of turning movement of the vehicle, the desired displacement quantity $\delta\phi$ is reduced to zero to resume the initial plain attitude. Thereafter, control is carried out to maintain this attitude.

As is apparent from the above description, according to the present invention, control for properly maintaining the vehicle body attitude in response to the longitudinal g is reliably carried out without delay. In addition, a driver can enjoy an arbitrary roll feeling in dependency on his own choice.

Incidentally, the present invention should not be limited only to the embodiment as shown in FIG. 1. Alternatively, control may independently be carried out for each active suspension in which fluid in the form of liquid or gas is fed therein and discharged therefrom.

As described above, the present invention has provided a method of controlling a plurality of active suspensions for an automotive vehicle, each of the active suspensions having respective values to feed fluid in the active suspension and discharge the fluid from the active suspension, wherein the method comprises the steps of detecting a lateral acceleration, indicating a desired rolling angle and a rolling direction in dependency on a selection of a normal/reverse rolling selection switch, calculating a rolling moment in response to the lateral acceleration and the desired rolling angle, computing a lateral displacement quantity for each wheel in response to the rolling moment, deriving a variation of a lateral force for each wheel in response to the lateral acceleration, estimating a vertical variation of a vertical reactive force for each wheel in consideration of deformation of the active suspension caused by the desired rolling angle in response to the lateral displacement quantity, lateral force, type of the active suspension and desired rolling angle, deciding a first control quantity corresponding to the amount of fluid to feed in or discharge from the active suspension in response to the variation of the vertical reactive force, and operating a control device for each active suspension in response to the control quantity so as to maintain the optimum rolling angle.

Further, according to the present invention, the method further includes the steps of detecting a vertical relative displacement, generating a reference vehicle height in response to a signal of a vehicle height adjusting switch, calculating a difference between the vertical relative displacement and the reference vehicle height, computing an actual rolling angle in response to the lateral acceleration, deriving a desired vertical relative displacement corresponding to the actual rolling angle, correcting the difference from the desired vertical relative displacement, and estimating a second control quantity to reduce the corrected difference equal to zero so to operate the control valve in response to the first and second quantities.

Consequently, the method of the present invention offers advantageous effects that a driver can set an arbitrary roll feeling during turning movement of a vehicle in dependency on his own choice, he can generate smooth rolling with high accuracy in proportion to the generated lateral g and he can enjoy natural and good turn feeling.

While the presently preferred embodiment of the present invention has been shown and described, it is to be understood that this disclosure is merely for the purpose of illustration and that various changes and modifications may be made without departure from the scope of the invention as set forth in the appended claims.

What is claimed is:

1. A method of controlling a plurality of active suspensions for an automotive vehicle, each of said active suspensions having respective valves to feed fluid in the active suspension and discharge said fluid from the active suspension, wherein said method comprises the steps of;

detecting a lateral acceleration,
   indicating a desired rolling angle and a rolling direction in dependency on a selection of a normal/reverse rolling selection switch,
   calculating a rolling moment in response to said lateral acceleration and said desired rolling angle,
   computing a lateral displacement quantity for each wheel in response to said rolling moment,
   deriving a variation of a lateral force for each wheel in response to the lateral acceleration,
   estimating a vertical variation of a vertical reactive force for each wheel in consideration of deformation of the active suspension in response to the lateral displacement quantity, the lateral force, type of the active suspension links and the desired rolling angle,
   deciding a first control quantity corresponding to the amount of fluid to feed in or discharge from the active suspension in response to the estimated vertical variation of the vertical reactive force, and
   operating a control valve for each said active suspension in response to the first control quantity so as to maintain an optimum rolling angle.

2. The method as claimed in claim 1 further comprising the steps of;

detecting a vertical relative displacement,
   generating a reference vehicle height in response to a signal of a vehicle height adjusting switch,
   calculating a difference between the vertical relative displacement and the reference vehicle height,
   computing an actual rolling angle in response to the lateral acceleration,
   deriving a desired vertical relative displacement corresponding to the actual rolling angle,
   correcting the difference from the desired vertical relative displacement, and
   estimating a second control quantity to reduce the corrected difference equal to zero so as to operate the control valve in response to the first and second control quantities.

* * * * *